United States Patent [19]

Saitoh et al.

[11] Patent Number: 5,009,463

[45] Date of Patent: Apr. 23, 1991

[54] REINFORCED PLASTIC AUTOMOBILE BODY STRUCTURE

[75] Inventors: Masahiro Saitoh; Suguru Yoshida; Keiichi Obata; Yoshinobu Ono, all of Saitama, Japan

[73] Assignee: Honda Giken Kogyo Kabushiki Kaisha, Tokyo, Japan

[21] Appl. No.: 517,381

[22] Filed: May 1, 1990

Related U.S. Application Data

[63] Continuation of Ser. No. 200,030, May 27, 1988, abandoned.

[30] Foreign Application Priority Data

May 27, 1987 [JP] Japan .............................. 62-80218[U]

[51] Int. Cl.$^5$ .......................... B62D 25/06; B60J 1/02; B60J 1/18
[52] U.S. Cl. ................... 296/210; 296/96.12; 296/215; 296/901
[58] Field of Search ..................... 296/203, 84.1, 96.12, 296/185, 210, 215, 901

[56] References Cited

U.S. PATENT DOCUMENTS

| D. 139,455 | 11/1944 | Walker | 296/185 X |
| 1,165,684 | 12/1915 | Leichsenring | 296/215 |
| 2,946,624 | 7/1960 | Bargnyi | 296/215 |
| 3,596,979 | 8/1971 | Habitzel | 296/901 X |
| 4,453,763 | 6/1984 | Richards | 296/185 |
| 4,640,527 | 2/1987 | Taylor | 296/185 X |

FOREIGN PATENT DOCUMENTS

| 160904 | 8/1943 | Fed. Rep. of Germany | 296/901 |
| 754829 | 4/1954 | Fed. Rep. of Germany | . |
| 3204526 | 8/1983 | Fed. Rep. of Germany | 296/210 |
| 2085242 | 12/1971 | France | . |
| 2398655 | 3/1979 | France | 296/185 |
| 504773 | 5/1939 | United Kingdom | 296/215 |

OTHER PUBLICATIONS

The Evening Star, 3/54, p. A-31, "Unlimited Creative Thinking".
The Washington Daily News, 11/59, p. 59, "On the Way".
SAE Journal, Dec. 1959, p. 175, vol. 67, No. 12, The Waimea.
Automotive Industries, 1/56, p. 36, vol. 114, No. 1, "Turbine Car . . . ".

Primary Examiner—Dennis H. Pedder
Attorney, Agent, or Firm—Lyon & Lyon

[57] ABSTRACT

An automobile body structure includes a canopy of plastic having a pair of thicker portions projecting on an inner surface of the canopy and spaced from each other in the fore-and-aft direction of the automobile body structure, and a rigid support member embedded in each of the thicker portions. The canopy includes a roof, and front and rear windows formed therewith of a unitary, undivided construction, the thicker portions being disposed near upper edges of the front and rear windows. The thicker portions are arch-shaped. The rigid support member comprises a solid rod or a hollow pipe.

5 Claims, 2 Drawing Sheets

REINFORCED PLASTIC AUTOMOBILE BODY STRUCTURE

This application is a continuation, of application Ser. No. 200,030, filed 5/27/88, abandoned.

BACKGROUND OF THE INVENTION

The present invention relates to a reinforced automobile body structure including a body shell and a windshield which are made of plastic.

Automobile windshields are generally in the form of glass sheets that are produced by bending flat glass sheets of constant thickness through a floating process.

Where windshields are made of glass, they are divided into front, side, and rear windows between which structural members such as pillars are disposed for a desired degree of mechanical strength.

The windshields comprising glass sheets cannot however be formed with ease. Since they are low in shock resistance, they must be divided into front, side, and rear windows and pillars must be provided therebetween.

Therefore, the glass windshields cannot be attached easily, increase the weight of the automobile, and are of poor aerodynamic characteristics.

Various efforts have been made to reduce the weight of automobiles. Particularly of interest in the art are attempts to form automobile bodies of plastic which is lower in specific gravity than steel sheets and glass.

If an automobile body structure is formed of plastic, it is lightweight, but poor in rigidity. If a plastic material is combined with other material or materials for increased rigidity, then the weight or cost of the formed body is increased.

SUMMARY OF THE INVENTION

It is an object of the present invention to provide a reinforced automobile body structure of plastic which can be formed to desired shape with increased freedom and which provides a smooth continuous windshield surface.

Another object of the present invention is to provide a reinforced automobile body structure of plastic which reduces automobile weight and increases automobile body rigidity.

According to the present invention, there is provided an automobile body structure comprising a canopy of plastic having at least one thicker portion projecting on an inner surface of the canopy and a rigid support member embedded in the thicker portion. The rigid support member comprises such as, for example, a solid rod or a hollow pipe.

The plastic canopy is lightweight, and can be shaped as desired with increased freedom. Since the rigid support member is embedded in the thick portion on the inner surface thereof, the outer surface of the canopy is smooth and continuous, resulting in improved aerodynamic characteristics. Use of the rigid support member renders the automobile body structure rigid or mechanically strong. Where the rigid support member is in the form of a hollow pipe, the canopy is made more lightweight.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
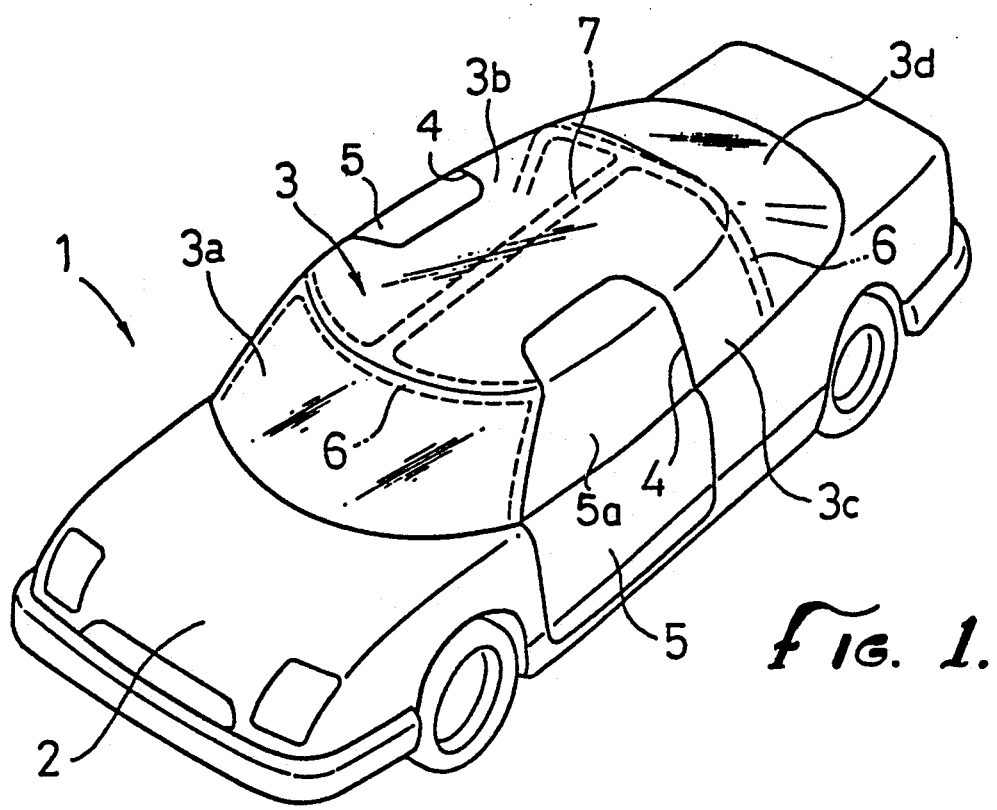
FIG. 1 is a perspective view of an automobile incorporating a reinforced plastic automobile body structure according to an embodiment of the present invention.

Like or corresponding parts are denoted by like or corresponding reference numerals throughout views.

As shown in FIG. 1, an automobile 1 incorporating a reinforced plastic body structure according to an embodiment of the present invention includes a body shell 2 of metal or plastic and a canopy 3 of plastic carried by the body shell.

The canopy 3 is in the form of an undivided, one-piece construction which comprises a front window 3a, a roof 3b extending rearwardly from an upper end of the front window 3a, side windows 3c extending downwardly from opposite rear side edges of the roof 3b, and a rear window 3d extending obliquely downwardly from a rear end of the roof 3b and having opposite side edges contiguous to the side windows 3c.

The roof 3b has an intermediate narrower portion. This intermediate narrower portion of the roof 3b, the front window 3a, and the side windows 3c jointly define openings 4 in which door panels 5 having door windows 5a are openably and closably mounted. The door panels 5 are hinged at their upper edges to the roof 3b so that the door panels 5 are vertically swingable to open or close the door openings 4.

Figure 2:
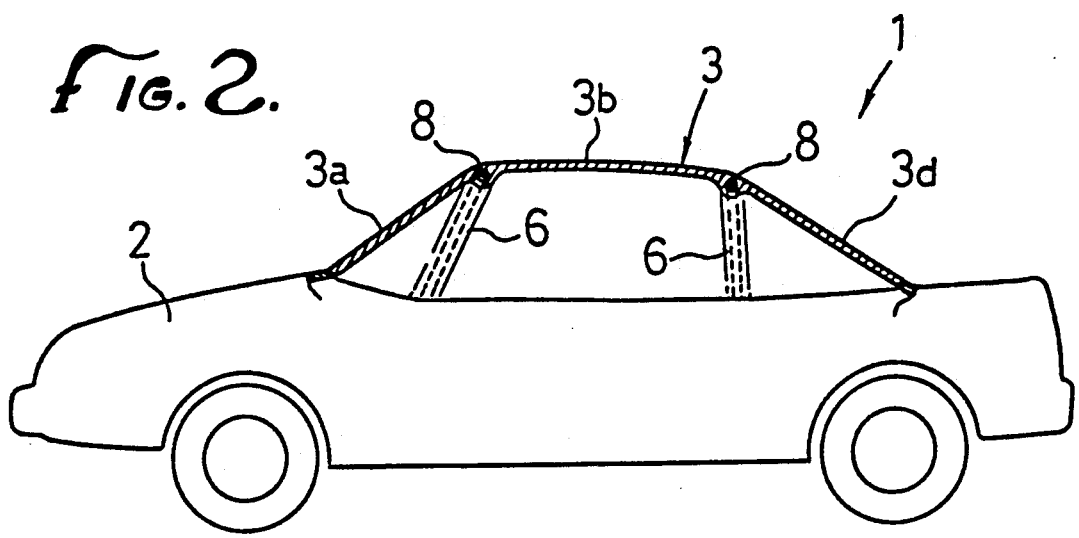
FIG. 2 is a fragmentary vertical cross-sectional view of the reinforced plastic automobile body structure shown in FIG. 1.
Figure 3:
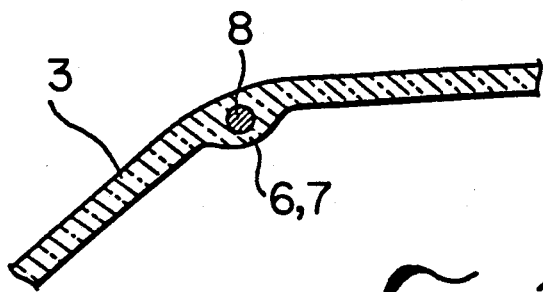
FIG. 3 is an enlarged fragmentary cross-sectional view of the automobile body structure of FIG. 1.

The canopy 3 includes a pair of arched, transversely extending thicker portions or ridges 6 projecting into the passenger compartment of the automobile 1 and spaced from each other in the longitudinal or fore-and-aft direction of the automobile 1. These thicker portions 6 are positioned along the upper edges of the front and rear windows 3a, 3d. The thicker portions 6 are interconnected by another, longitudinally extending thicker portion or ridge 7 disposed on the lower surface of the roof 3b and extending in the fore-and-aft direction of the automobile 1. A rigid support member 8 in the form of a solid rod is embedded in each of the thicker portions 6, 7, as shown in FIGS. 2 and 3. The rigid support members 8 embedded in the thicker portions 6 are also arch-shaped. The rigid support members 8 may be of any material insofar as it does not result in a substantial increase in the automobile weight and increases the rigidity or mechanical strength of the canopy 3.

For molding the canopy 3 with the rigid support members 8 embedded therein, a mold having a mold cavity which is of a shape complementary to that of the canopy 3 is provided, and the rigid support members 8 are set in position in the mold cavity where the thick portions 6, 7 are to be formed. Then, a liquid-phase plastic material monomer such as diethylene glycol biallyl carbonate, for example, is poured into the mold cavity, and then heated for polymerization and set.

The thicker portions or ridges may be positioned anywhere, as desired, in the canopy 3 shown in FIG. 1.

Since the canopy 3 is made of plastic, the rigid support members 8 can be embedded anywhere as desired in the canopy 3, so that the canopy 3 can be shaped as desired with increased freedom. Moreover, because the rigid support members 8 are embedded in the thick portions 6, 7 projecting into the passenger compartment, the outer surface of the canopy 3 is smooth and continuous, resulting in improved aerodynamic characteristics.

Figure 4:
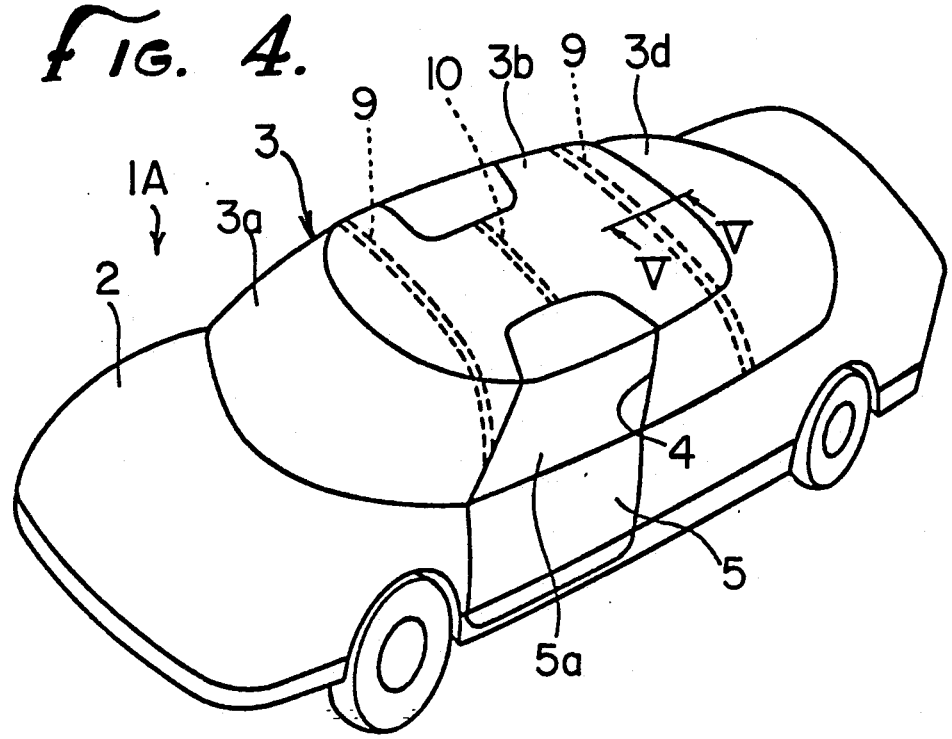
FIG. 4 is a perspective view of an automobile incorporating a reinforced plastic automobile body structure according to another embodiment of the present invention.

FIG. 4 shows an automobile having a reinforced plastic automobile body structure in accordance with another embodiment of the present invention. The automobile, generally designated at 1A, has a reinforced plastic automobile body structure including a body shell 2 of plastic and a canopy 3 of plastic which is substantially identical to that shown in FIG. 1.

Figure 5:
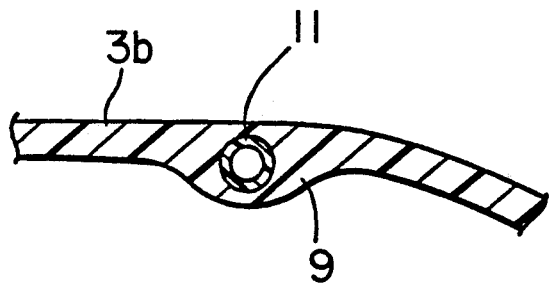
FIG. 5 is an enlarged fragmentary cross-sectional view taken along line V—V of FIG. 4.

The canopy 3 includes a pair of arched transverse thicker portions or ridges 9 projecting into the passenger compartment of the automobile 1 and spaced from each other in the longitudinal or fore-and-aft direction of the automobile 1. These thicker portions 9 are positioned near the upper edges of the front and rear windows 3a, 3d. Another transverse thicker portion or ridge 10 is disposed on the lower surface of the roof 3b and extends between the door openings 4. A rigid support member 11 in the form of a hollow pipe is embedded in and along each of the thicker portions 9, 10, as shown in FIG. 5. The rigid support members 11 embedded in the thicker portions 9 are also arch-shaped. As with the first embodiment, the rigid support members 11 may be of any material insofar as it does not result in a substantial increase in the automobile weight and increases the rigidity or mechanical strength of the canopy 3.

The automobile body structure shown in FIG. 4 is molded of plastic in the same manner as described with reference to the embodiment shown in FIGS. 1 through 3. The plastic body structure of FIG. 4 is lightweight because the rigid support members 11 embedded in the projections, or thicker portions 9 are in the form of hollow pipes. Also, the body structure 4 is made rigid by the rigid support members 11.

Although certain preferred embodiments have been shown and described, it should be understood that many changes and modifications may be made therein without departing from the scope of the appended claims.

What is claimed is:

1. An automobile body structure comprising:
   a body shell;
   a canopy of molded plastic material carried by said body shell including a front windshield section, a top section, and a rear window section integrally formed of undivided, one-piece construction, said canopy having a primary thickness between interior and exterior surfaces thereof that is substantially uniform;
   said interior surface of said canopy extending inwardly to form at least one continuous projection of a thickness greater than said primary thickness which extends laterally across said canopy; and
   an arch-shaped rigid support member separate from, but embedded in, said projection and being substantially coextensive therewith.

2. The body structure of claim 1 in which said at least one projection includes a first projection adjacent said front windshield section and a second projection spaced from said first projection.

3. The body structure of claim 2 wherein said second projection is adjacent said rear window section.

4. The body structure of claim 2 including oppositely, laterally spaced door openings in said body shell and said canopy; and a third projection embedding a separate, substantially coextensive rigid support member positioned intermediate said first and second projections and extending laterally across said top section between said door openings.

5. The body structure of claim 2 further comprising a longitudinal projection of a thickness greater than said primary thickness extending inwardly from said canopy interior surface and between said first and second projections; and a separate rigid support member embedded in said longitudinal projection and extending between and joining said rigid members of said first and second projections.

* * * * *